US012485861B2

United States Patent
Hayes et al.

(10) Patent No.: US 12,485,861 B2
(45) Date of Patent: Dec. 2, 2025

(54) TRAILER SWAY DETECTION AND MITIGATION USING A CAMERA MIRROR SYSTEM

(71) Applicant: Bendix Commercial Vehicle Systems LLC, Avon, OH (US)

(72) Inventors: Thomas J. Hayes, Lakewood, OH (US); William R. Plow, Avon, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 235 days.

(21) Appl. No.: 18/232,925

(22) Filed: Aug. 11, 2023

(65) Prior Publication Data

US 2025/0050849 A1 Feb. 13, 2025

(51) Int. Cl.
*B60T 8/1755* (2006.01)
*B60T 8/17* (2006.01)
(Continued)

(52) U.S. Cl.
CPC ........ *B60T 8/17551* (2013.01); *B60T 8/1708* (2013.01); *B60T 8/171* (2013.01);
(Continued)

(58) Field of Classification Search
CPC .... B60T 8/17551; B60T 8/1708; B60T 8/171; B60T 2230/06; B60T 8/1887;
(Continued)

(56) References Cited

U.S. PATENT DOCUMENTS 8,955,853 B1 2/2015 Perkins
9,120,359 B2 9/2015 Chiu
(Continued)

FOREIGN PATENT DOCUMENTS

DE 10 2015 218033 A1 3/2017
DE 10 2020 129455 A1 5/2022
(Continued)

OTHER PUBLICATIONS

International Search Report and Written Opinion, Sep. 20, 2024, pp. 1-14, issued in International Application No. PCT/US2024/035223, European Patent Office, Rijswijk, Netherlands.
(Continued)

*Primary Examiner* — Xiao En Mo
(74) *Attorney, Agent, or Firm* — Crowell & Moring LLP

(57) ABSTRACT

Embodiments are presented herein for trailer sway detection and mitigation using a camera mirror system. In one embodiment, a vehicle controller is provided comprising: one or more processors; a non-transitory computer-readable medium; and program instructions stored on the non-transitory computer-readable medium. When executed by the one or more processors, the program instructions cause the one or more processors to: monitor images captured by at least one image capture device to detect sway of a trailer being towed by a tractor; and in response to detecting sway of the trailer, cause a braking system to apply a brake to attempt to reduce to the sway of the trailer.

18 Claims, 6 Drawing Sheets

(51) Int. Cl.
  *B60T 8/171* (2006.01)
  *G06T 7/73* (2017.01)
  *H04N 23/695* (2023.01)

(52) U.S. Cl.
  CPC ............ *G06T 7/73* (2017.01); *H04N 23/695* (2023.01); *B60T 2230/06* (2013.01); *G06T 2207/30252* (2013.01)

(58) Field of Classification Search
  CPC . B60T 8/248; G06T 7/73; G06T 2207/30252; H04N 23/695
  See application file for complete search history.

(56) References Cited

U.S. PATENT DOCUMENTS

| | | | |
|---|---|---|---|
| 9,374,562 | B2 | 6/2016 | Trombley |
| 9,558,409 | B2 | 1/2017 | Pliefke |
| 9,963,004 | B2 | 5/2018 | Lavoie |
| 11,364,885 | B2 | 6/2022 | Viele |
| 11,485,330 | B1 | 11/2022 | Kulkarni |
| 11,752,943 | B1 | 9/2023 | Ma et al. |
| 2006/0204347 | A1 | 9/2006 | Waldbauer et al. |
| 2008/0172163 | A1 | 7/2008 | Englert |
| 2009/0093928 | A1 | 4/2009 | Getman et al. |
| 2010/0198492 | A1 | 8/2010 | Watanabe |
| 2010/0332049 | A1 | 12/2010 | Sy et al. |
| 2011/0029210 | A1 | 2/2011 | Wu et al. |
| 2012/0041659 | A1 | 2/2012 | Greene |
| 2014/0071278 | A1 | 3/2014 | Assaf |
| 2014/0085472 | A1* | 3/2014 | Lu .................. B60R 1/26 348/148 |
| 2014/0200759 | A1 | 7/2014 | Lu et al. |
| 2015/0367844 | A1 | 12/2015 | Tagesson |
| 2016/0023525 | A1 | 1/2016 | Lavoie |
| 2017/0151935 | A1 | 6/2017 | Prohaszka et al. |
| 2017/0240125 | A1 | 8/2017 | Weigert |
| 2019/0084537 | A1 | 3/2019 | Kasper et al. |
| 2019/0217831 | A1 | 7/2019 | Viele |
| 2019/0375454 | A1 | 12/2019 | Kasaiezadeh Mahabadi et al. |
| 2021/0114424 | A1 | 4/2021 | Jamison |
| 2021/0160433 | A1 | 5/2021 | Berne |
| 2021/0291738 | A1 | 9/2021 | Lang et al. |
| 2022/0196395 | A1 | 6/2022 | Maehnert |
| 2022/0292887 | A1 | 9/2022 | Cooprider |
| 2022/0306060 | A1 | 9/2022 | Vikström et al. |
| 2022/0314718 | A1 | 10/2022 | Nguyen et al. |
| 2022/0396209 | A1 | 12/2022 | Sharma |
| 2023/0137098 | A1 | 5/2023 | Miao et al. |
| 2023/0162509 | A1 | 5/2023 | DeLizo et al. |
| 2023/0260288 | A1 | 8/2023 | Young et al. |
| 2025/0050849 | A1 | 2/2025 | Hayes |
| 2025/0083602 | A1 | 3/2025 | Ma |

FOREIGN PATENT DOCUMENTS

| | | |
|---|---|---|
| EP | 2 949 532 B1 | 6/2022 |
| WO | WO 2011/042966 A1 | 4/2011 |
| WO | WO 2021/151516 A1 | 8/2021 |

OTHER PUBLICATIONS

Bal, S.; "How Digital side view mirrors enhance driving safety?"; downloaded from the Internet on Sep. 26, 2023 at https://carbiketech.com/digital-side-view-mirrors-explained/; carbiketech.com; Dec. 12, 2018; 6 pages.

Bal, S.; "What Is Honda LaneWatch? All You Need to Know"; downloaded from the Internet on Sep. 26, 2023 at https://carbiketech.com/honda-lanewatch/; carbiketech.com; May 6, 2019; 5 pages.

Cole, S.; "Federal DOT FMCSA NHTSA Reflective Tape Requirements—Trucks Tractor Trailers"; downloaded from the Internet on Sep. 26, 2023 at https://reflectivetape.info/federal-dot-reflective-tape-reguirements-for-trucks-and-tractor-trailers/#:~:text=Introduction%20%20Trucks%20exceeding%2010%2C000%20pounds,each%20side%20must%20be%20covered; "All About Reflective Tap" informational website; Reflective Inc.; Jan. 23, 2011; 3 pages.

"ECFR § 571.108 Standard No. 108; Lamps, reflective devices, and associated equipment"; Code of Federal Regulations; Title 49, Subtitle B, Chapter V, Part 571, Subpart B; National Archives; Sep. 1, 2023; 168 pages.

Terzis, A. (Editor); Handbook of Camera Monitor Systems: The Automotive Mirror-Replacement Technology based on ISO 16505, vol. 5: Augmented Vision and Reality; SpringerNature, Springer International Publishing AG Switzerland; ISBN 978-3-319-29609-8; 2016; 539 pages.

Final Office Action dated Apr. 1, 2025 for U.S. Appl. No. 18/373,390.

"§ 571.3 Definitions," from the Code of Federal Regulations, Title 49, Subtitle B, Chapter V, Part 571, Subpart A; downloaded from the Internet on Aug. 10, 2023 at https://www.ecfr.gov/current/title-49/subtitle-B/chapter-V/part-571/subpart-A/section-571.3; National Archives; Aug. 1, 2023; 5 pages.

"Bendix® Wingman® Fusion™"; Advanced Driver Assistance System product page; downloaded from the Internet on Aug. 10, 2023 at Bendix® Wingman® Fusion™ *I Bendix Commercial Vehicle Systems*; Bendix CVS; 5 pages.

"MirrorEye®: replace truck mirrors with a camera system"; Product page; downloaded from the Internet on Aug. 10, 2023 at *MirrorEye®: replace truck mirrors with a camera system* (orlaco.com); Stoneride; Orlaco; 5 pages.

International Search Report mailed Nov. 25, 2024 for International Application No. PCT/US2024/042056.

Written Opinion mailed Nov. 25, 2024 for International Application No. PCT/US2024/042056.

Non-final Office Action dated Jun. 16, 2025 for U.S. Appl. No. 18/232,921.

* cited by examiner

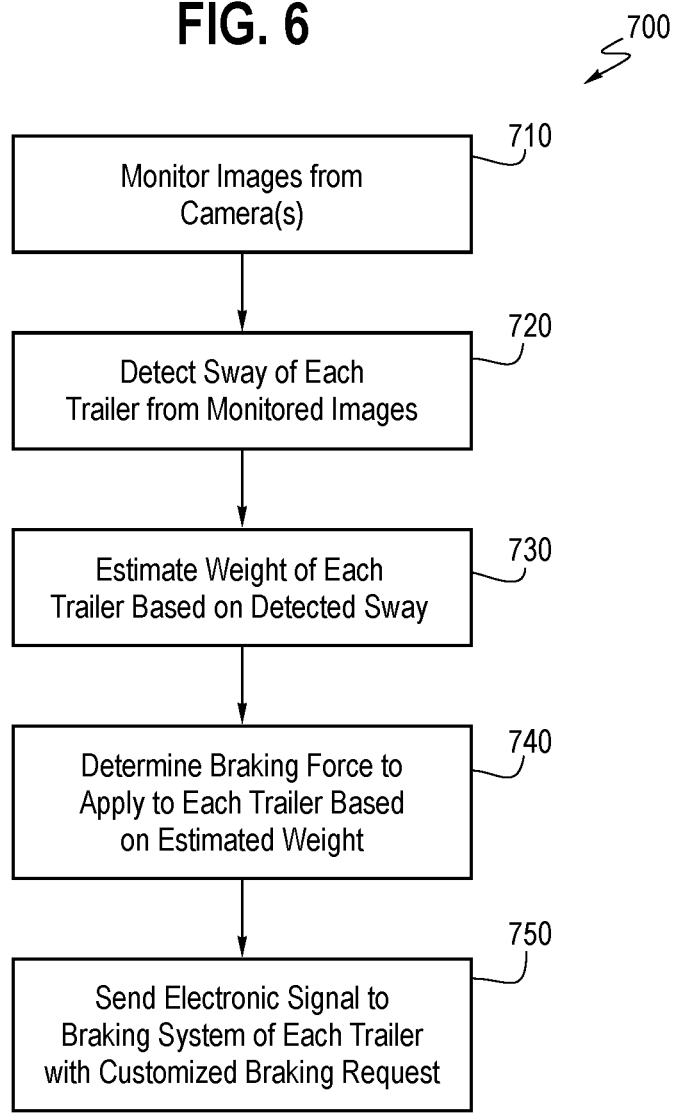

TRAILER SWAY DETECTION AND MITIGATION USING A CAMERA MIRROR SYSTEM

BACKGROUND

Some heavy-duty commercial vehicles configured for towing a trailer can be equipped with one or more cameras. For example, a camera can be used as a replacement for a front mirror to allow a driver to see the side of the vehicle.

BRIEF DESCRIPTION OF THE DRAWINGS

FIG. 6 is a flow chart of a method of an embodiment for trailer braking distribution.

SUMMARY

The following embodiments generally relate to trailer sway detection and mitigation using a camera mirror system. In one embodiment, a vehicle controller is provided comprising: one or more processors; a non-transitory computer-readable medium; and program instructions stored on the non-transitory computer-readable medium. When executed by the one or more processors, the program instructions cause the one or more processors to: monitor images captured by at least one image capture device to detect sway of a trailer being towed by a tractor; and in response to detecting sway of the trailer, cause a braking system to apply a brake to attempt to reduce to the sway of the trailer.

In another embodiment, a method is provided that is performed in a vehicle comprising a tractor, a trailer towed by the tractor, and at least one image capture device. The method comprises: analyzing images captured by the at least one capture device to determine a position of a trailing edge of the trailer over a period of time; detecting a sway of the trailer based on the position of the trailing edge of the trailer over the period of time; and in response to detecting the sway of the trailer, attempting to reduce the sway of the trailer.

In yet another embodiment, a tractor is provided comprising: at least one image capture device; means for detecting sway of a trailer being towed by the tractor using images captured by the at least one image capture device; and means for applying a brake to attempt to reduce the sway of the trailer.

Other embodiments are possible, and each of the embodiments can be used alone or together in combination.

DETAILED DESCRIPTION

Figure 1:
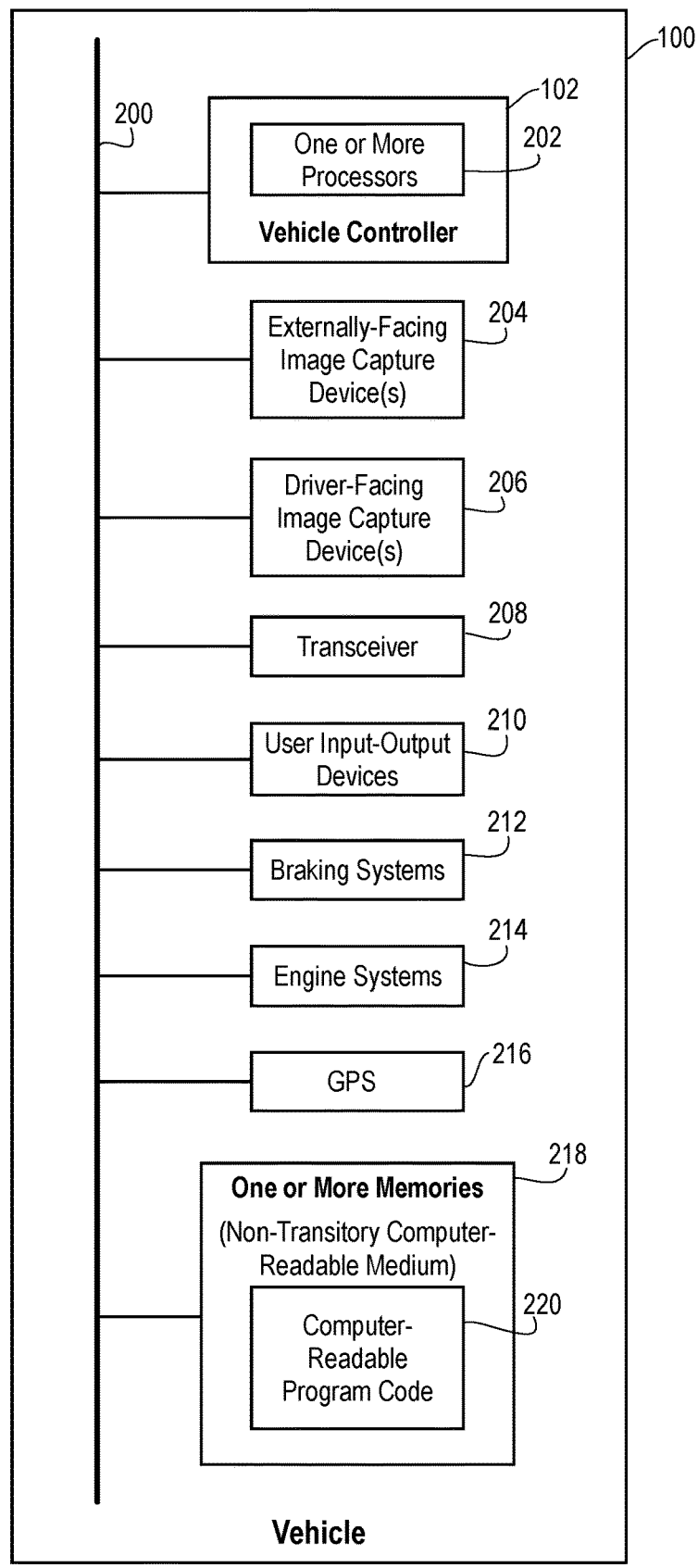
FIG. 1 is a block diagram of components of a vehicle of an embodiment.

Turning now to the drawings, FIG. 1 is a block diagram of example components of a vehicle 100 of an embodiment. In one embodiment, the vehicle 100 is an on/offroad vehicle as described by NHTSA Title 49, Subtitle B, Chapter V, Part 571, Subpart A, Section 571.3, where the vehicle can be one or more of the following in sensible combinations: "Truck", "Truck tractor", "Trailer", "Full trailer", "Trailer converter dolly", "Semitrailer", and/or "Pole trailer."

As shown in FIG. 1, the vehicle in this example comprises one or more of the following: a vehicle controller 102 comprising one or more processors 202, externally-facing image capture device(s) (e.g., camera(s)) 204, driver-facing image capture device(s) 206, a transceiver 208, user input-output (IO) devices 210 (e.g., a microphone, a speaker, a touchscreen, indicator lights, etc.), a braking system 212, an engine system 214, a global positioning system (GPS) 216 that can identify a location of the vehicle, and one or more memories 218. An image capture device can be any device capable of digitizing an image (e.g., camera, LIDAR, radar, ultrasound, etc., or any combination thereof). These various components can be in communication with each other directly or indirectly (through components that may or may not be shown or described herein) via wired or wireless connections. In the example in FIG. 1, the components are directly or indirectly connected via a bus 200, which can take the form of a controller area network (CAN).

The one or more memories 218 (e.g., one or more non-transitory computer-readable medium) store computer-readable program code 220. These one or more memories 218 can be the same type or different types and can be part of the same memory device or be different memory devices. For example, some or all of the memories in the one or more memories 218 can be volatile or non-volatile non-transitory memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof.

The one or more processors 202 can execute the computer-readable program code 220, which can have instructions (e.g., modules, routines, sub-routine, programs, applications, etc.) that, when executed by the one or more processors 202, cause the one or more processors 202 to perform certain functions, such as those discussed herein, as well as other functions not described herein. It should be noted that the one or more processors 202 can have different functions (e.g., a first subset of one or more processors can be used for certain functions, while a second subset of one or more processors can be used for other certain functions). The one or more processors 202 can also take the form of a purely-hardware implementation (e.g., an application-specific integrated circuit (ASIC)).

As mentioned above, some heavy-duty commercial vehicles configured for towing a trailer can be equipped with one or more cameras. For example, the camera(s) can be used as a replacement for side mirror(s) to allow a driver to see the side(s) of the vehicle or can augment a side mirror. The following embodiments take advantage of this technological shift away from traditional mirrors to camera-based systems to provided additional functions not previously possible. For example, a driver is unable to continuously look at side mirrors as that would take their attention away from the road. However, with a camera-based side-mirror system, a connected system can be able to use the camera system to continuously monitor information captured by the camera for any items of interest and take various actions in response.

In one embodiment, the one or more cameras 204 on the vehicle are used to detect and react to sway of the trailer(s) coupled with the tractor. As used herein, sway refers to movement of a trailer that occurs without a matching steering angle measurement. Sway is sometimes detected using inertia measurement unit (IMU) sensors that detect tipping, but detecting sway with a camera-based system can provide an additional measurement operating as primary, secondary or even sole confirmation of trailer sway. In general, a camera is positioned to view the side of the trailer(s) being pulled by the tractor, and the processor(s) 202 monitor the trailing edge of the trailer(s) for a programmable period of time and look for any changes in the trailer angle. The processor(s) 202 can have access to the video feed of the camera 204, as well as to data from the steering angle sensor 118 to monitor for sway. The processor(s) 202 can also have the ability to request braking force by the braking system 212 in order to react to the sway.

Figure 2:
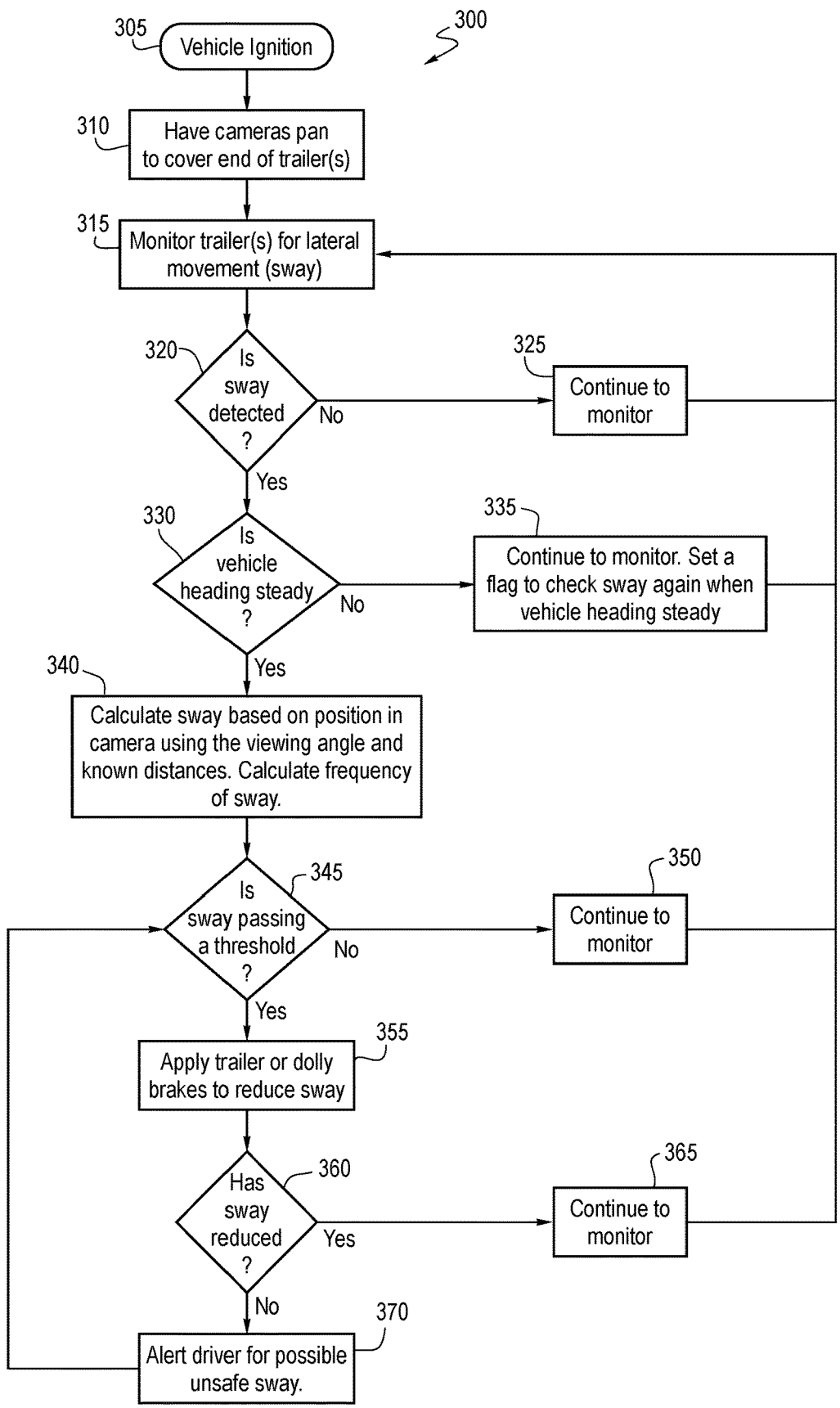
FIG. 2 is a flow chart of a method of an embodiment for trailer sway detection and mitigation using a camera mirror system.

Turning again to the drawings, FIG. 2 is a flow chart 300 of a method that illustrates an example implementation of this embodiment. As shown in FIG. 2, after vehicle ignition (act 305), the processor(s) 202 cause the camera to pan either digitally or physically, so that the field of view of the camera covers the end of the trailer(s) (act 310). With the camera in position, the processor(s) 202 monitor the trailer(s) for lateral movement (sway) (act 315). For example, a side-view camera 204 can establish where the trailing edge of a trailer is and retain that information in memory 218. The camera 204 can continue to observe the section and monitor it for any kind of sway. In one implementation, the processor(s) 202 can record the position of the trailing edge of a trailer for a programmable period of time (e.g., 1-5 seconds). The processor(s) 202 can use the recorded positions to determine the angle between the tractor and the trailer in an array at specific time intervals.

The processor(s) 202 can then determine if sway is detected (act 320). In one embodiment, sway can be detected when the trailer angle is changing periodically without a matching steering angle measurement recorded at the same time intervals mentioned above. The "deltas" between these curves can also detect a driver's "reaction." If sway is not detected, the processor(s) 202 continue to monitor the camera's feed (act 325). However, if sway is detected, the processor(s) 202 determine if the vehicle's heading is steady (act 330). If the vehicle's heading is not steady, the processor(s) 202 continue to monitor the camera's feed and set a flag to check for sway again when the vehicle's heading is steady (act 335).

State of the art today utilizes Steer Angle Sensor (SAS) data with lateral acceleration sensors and/or individual wheel speed sensors. These sensors can be used solely or in any combination to determine direction or change in direction of the tractor and tractor/trailer combination. This intended direction is an input to determining trailer sway.

In one example implementation of this method, if sway is detected by the camera system 204, the processor(s) 202 can check if the steering angle is near-center or steady. If the steering angle is not near-center or steady, the processor(s) 202 can recheck for sway once the steering angle is near-center or steady. At a steering angle of near-center or steady, the processor(s) 202 can calculate a frequency and, if possible, a distance of sway.

If the vehicle's heading is steady, the processor(s) 202 calculate sway based on the trailer(s)'s position using the viewing angle and known distances and also calculates the frequency of the sway (act 340). The processor(s) 202 then determine if the frequency of the sway exceeds a threshold (act 345). If the frequency of the sway does not exceed the threshold, the processor(s) 202 continue to monitor the camera's feed (act 350). However, if the frequency of the sway exceeds the threshold, the processor(s) 202 apply the trailer or dolly brakes to reduce the sway (act 355). The processor(s) 202 then check to see if the sway has been reduced (e.g., below the threshold) (act 360). If the sway has been adequately reduced, the processor(s) 202 continue to monitor the camera's feed (act 365). However, if the sway has not been adequately reduced, the processor(s) 202 can alert the driver of a possible unsafe sway (act 270), so the driver can take the appropriate actions (e.g., reduce speed, change steering angle, etc.). It should be noted that this is merely an example and that other implementations can be used.

Many alternatives are possible. For example, instead of or in addition to mitigating trailer sway, detected sway can be used to distribute trailer braking. By way of background, in many vehicles, when brakes are applied to trailers, a brake control signal is provided from the tractor via air to all trailers. The air signal builds slower and slower to each trailer and eventually provides an equal braking request for the trailers. If the trailers are not loaded equally, a lightly-loaded trailer can experience an automated braking system (ABS) intervention by being over-braked. This embodiment exploits the fact that trailers differing enough in weight will experience trailer sway with different characteristics. By calculating the relative weight of each trailer, the processor(s) 202 can send an electronic tractor-trailer communication signal to the braking system of each individual trailer to apply the appropriate amount of braking to each trailer when service brakes are applied. This overcomes the problem noted above when an air signal is used.

Figure 3:
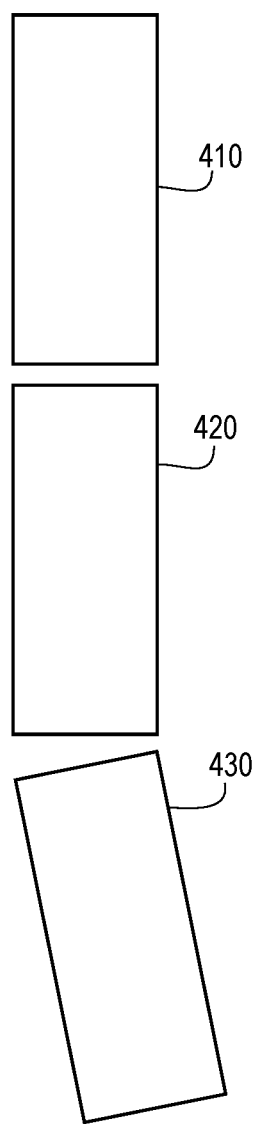
FIG. 3-5 are diagrams that illustrate various trailer sway situations addressed by an embodiment.
Figure 4:
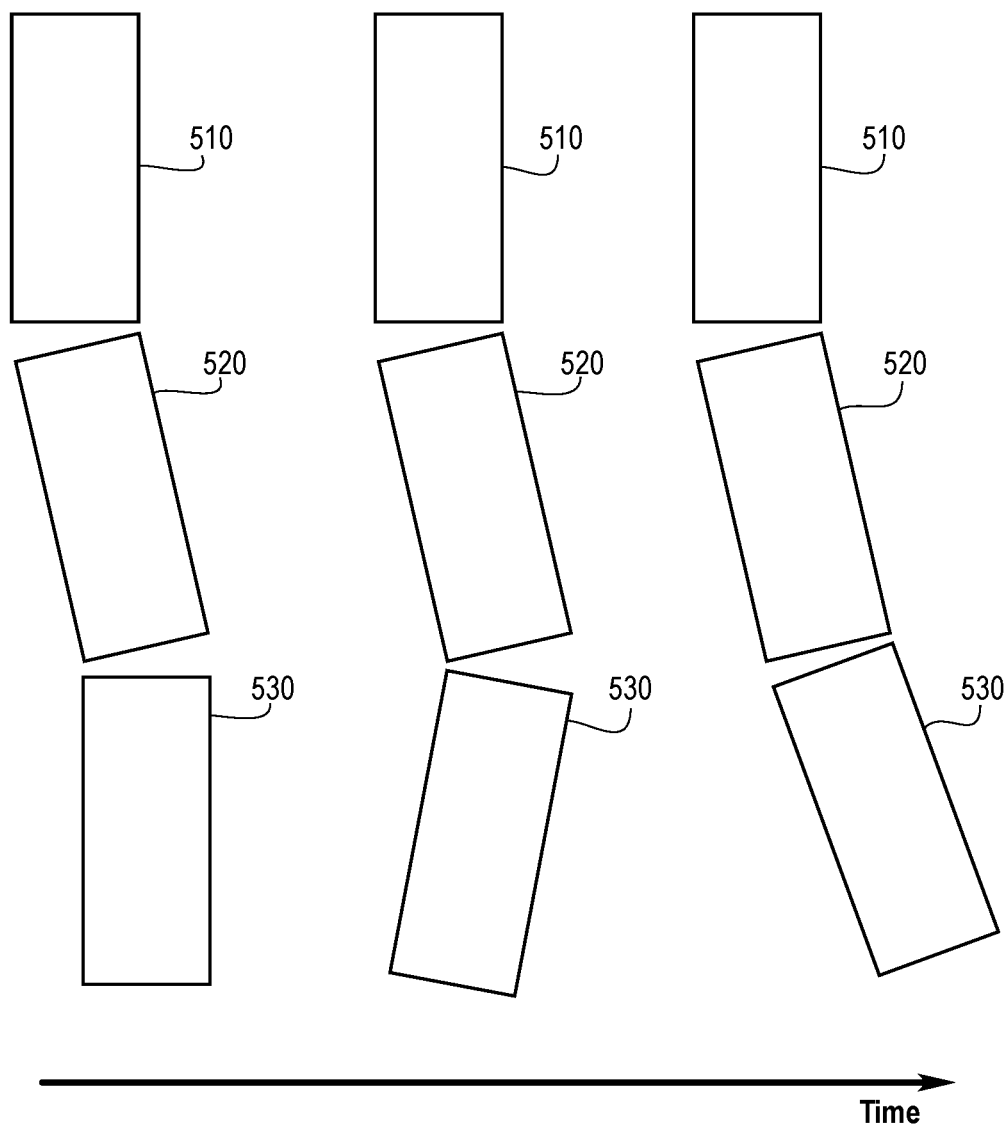
Figure 5:
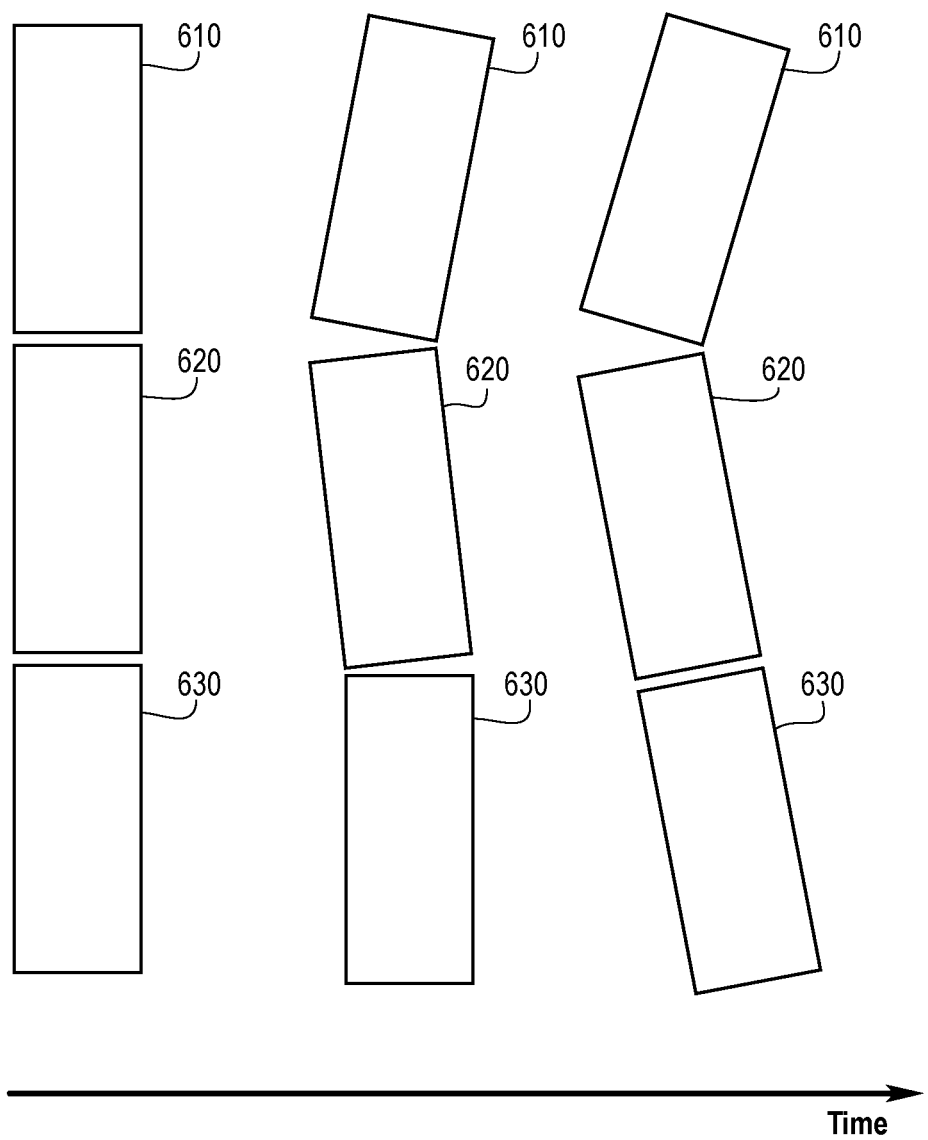

FIGS. 3-5 are diagrams that illustrate this embodiment. These diagrams show trailers, but the tractor towing the trailers is not shown to simplify the drawings. In FIG. 3, the third trailer 430 oscillates when it is the lightest. Therefore, it may be desired to brake less on the third trailer 430 and more on the other trailers 410, 420. As shown in FIG. 4, the second trailer 520, when it is the lightest, oscillates and then causes additive/subtractive oscillations over time to the other trailers 510, 530. Therefore, it may be desired to brake less on the second trailer 520 and more on the third trailer 530. As shown in FIG. 5, the first trailer 610, when it is the lightest, oscillates and then causes additive/subtractive oscillations over time to the other trailers 610, 630. Therefore, it may be desired to brake less on the first trailer 610 and more on the second and third trailers 620, 630. In this situation, it may be desired to warn the driver of an imminent loss of stability.

FIG. 6 is a flow chart 700 that illustrates an example implementation of this embodiment. As shown in FIG. 6, the processor(s) 202 monitor images from the camera(s) 204 (e.g., side-view and/or rear-view cameras) (act 710) and detect sway in the trailer(s) using the monitored images, as discussed above (act 720). For example, the processor(s) 202 can analyze images from the camera(s) 204 to monitor the vertical edges of the leading and trailing edges of each trailer behind the tractor. Observations over time allow the processor(s) 202 to identify and measure the frequency and magnitude of trailer sway (oscillations). Sway behavior of each individual trailer can have different observable characteristics based on which one is the lightest and by how much. Using the detected sway and a combined vehicle weight estimate, the processor(s) 202 can estimate/recalculate the weight of each individual trailer (act 730). The processor(s) 202 can then determine the braking force to apply to each trailer based on the estimated weight (act 740). That way, when brakes are applied, the processor(s) 202 can send a customized electronic signal to the braking system of each trailer to brake according to the braking force calculated for each individual trailer (act 750). As mentioned above, using individualized braking forces for the trailers can be better/safer than using an air signal that attempts to apply a uniform brake force in each trailer.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A vehicle controller comprising:
   one or more processors;
   a non-transitory computer-readable medium; and
   program instructions stored on the non-transitory computer-readable medium that, when executed by the one or more processors, cause the one or more processors to:
      monitor images captured by at least one image capture device to detect sway of a trailer being towed by a tractor; and
      in response to detecting sway of the trailer, cause a braking system to apply a brake to attempt to reduce the sway of the trailer;
   wherein the program instructions further cause the one or more processors to:
      determine a position of a trailing edge of the trailer over a period of time; and
      determine an angle between the tractor and the position of the trailing edge of the trailer over the period of time;
   wherein the sway of the trailer is detected in response to the angle changing without a corresponding change in a steering angle measurement.

2. The vehicle controller of claim 1, wherein the program instructions further cause the one or more processors to:
   determine whether applying the brake reduced the sway of the trailer below a threshold; and
   in response to determining that applying the brake did not reduce the sway of the trailer below the threshold, alert a driver.

3. The vehicle controller of claim 1, wherein the program instructions further cause the one or more processors to:
   calculate a distance of the sway of the trailer;
   wherein the braking system is caused to apply the brake to attempt to reduce to the sway of the trailer in response to the distance of the sway of the trailer exceeding a threshold.

4. The vehicle controller of claim 1, wherein the brake comprises a dolly brake.

5. The vehicle controller of claim 1, wherein the at least one image capture device augments a side mirror.

6. A vehicle controller comprising:
   one or more processors;
   a non-transitory computer-readable medium; and
   program instructions stored on the non-transitory computer-readable medium that, when executed by the one or more processors, cause the one or more processors to:
      monitor images captured by at least one image capture device to detect sway of a trailer being towed by a tractor; and
      in response to detecting sway of the trailer, cause a braking system to apply a brake to attempt to reduce the sway of the trailer;
   wherein the program instructions further cause the one or more processors to:
      determine a position of a trailing edge of the trailer over a period of time; and
      determine an angle between the tractor and the position of the trailing edge of the trailer over the period of time;
   wherein the sway of the trailer is detected in response to a frequency of changing of the angle exceeding a threshold.

7. The vehicle controller of claim 6, wherein the program instructions further cause the one or more processors to:
   determine if a steering angle is near-center or steady; and
   in response to determining that the steering angle is not near-center or steady, set a flag to recheck for the sway of the trailer once the steering angle is near-center or steady.

8. The vehicle controller of claim 6, wherein the program instructions further cause the one or more processors to:
   cause panning of the at least one image capture device to place an image of the trailing edge of the trailer in a field of view of the at least one image capture device.

9. The vehicle controller of claim 6, wherein the brake comprises a trailer brake.

10. The vehicle controller of claim 6, wherein the at least one image capture device comprises a replacement for a side mirror.

11. A method comprising:
    performing in a vehicle comprising a tractor, a trailer towed by the tractor, and at least one image capture device:
       analyzing images captured by the at least one capture device to determine a position of a trailing edge of the trailer over a period of time;
       detecting a sway of the trailer based on the position of the trailing edge of the trailer over the period of time; and
       in response to detecting the sway of the trailer, attempting to reduce the sway of the trailer;
    wherein the method further comprises determining an angle between the tractor and the position of the trailing edge of the trailer over the period of time;
    wherein the sway of the trailer is detected based on the angle changing without a corresponding change in a steering angle measurement.

12. The method of claim 11, further comprising:
    determining whether the sway of the trailer was reduced below a threshold; and
    in response to determining that the sway of the trailer was not reduced below the threshold, alerting a driver.

13. The method of claim 11, further comprising:
calculating a distance of the sway of the trailer;
wherein attempting to reduce the sway of the trailer is performed in response to the distance of the sway of the trailer exceeding a threshold.

14. The method of claim 11, further comprising:
determining if a steering angle is near-center or steady; and
in response to determining that the steering angle is not near-center or steady, setting a flag to recheck for the sway of the trailer once the steering angle is near-center or steady.

15. The method of claim 11, wherein attempting to reduce the sway of the trailer comprises applying a trailer brake or a dolly brake.

16. A method comprising:
performing in a vehicle comprising a tractor, a trailer towed by the tractor, and at least one image capture device:
analyzing images captured by the at least one capture device to determine a position of a trailing edge of the trailer over a period of time;
detecting a sway of the trailer based on the position of the trailing edge of the trailer over the period of time; and
in response to detecting the sway of the trailer, attempting to reduce the sway of the trailer;
wherein the method further comprises determining an angle between the tractor and the position of the trailing edge of the trailer over the period of time;
wherein the sway of the trailer is detected in response to a frequency of a change in the angle exceeding a threshold.

17. The method of claim 16, further comprising:
panning the at least one image capture device to place an image of the trailing edge of the trailer in a field of view of the at least one image capture device.

18. The method of claim 16, wherein the at least one image capture device comprises a replacement for a side mirror.

* * * * *